United States Patent Office

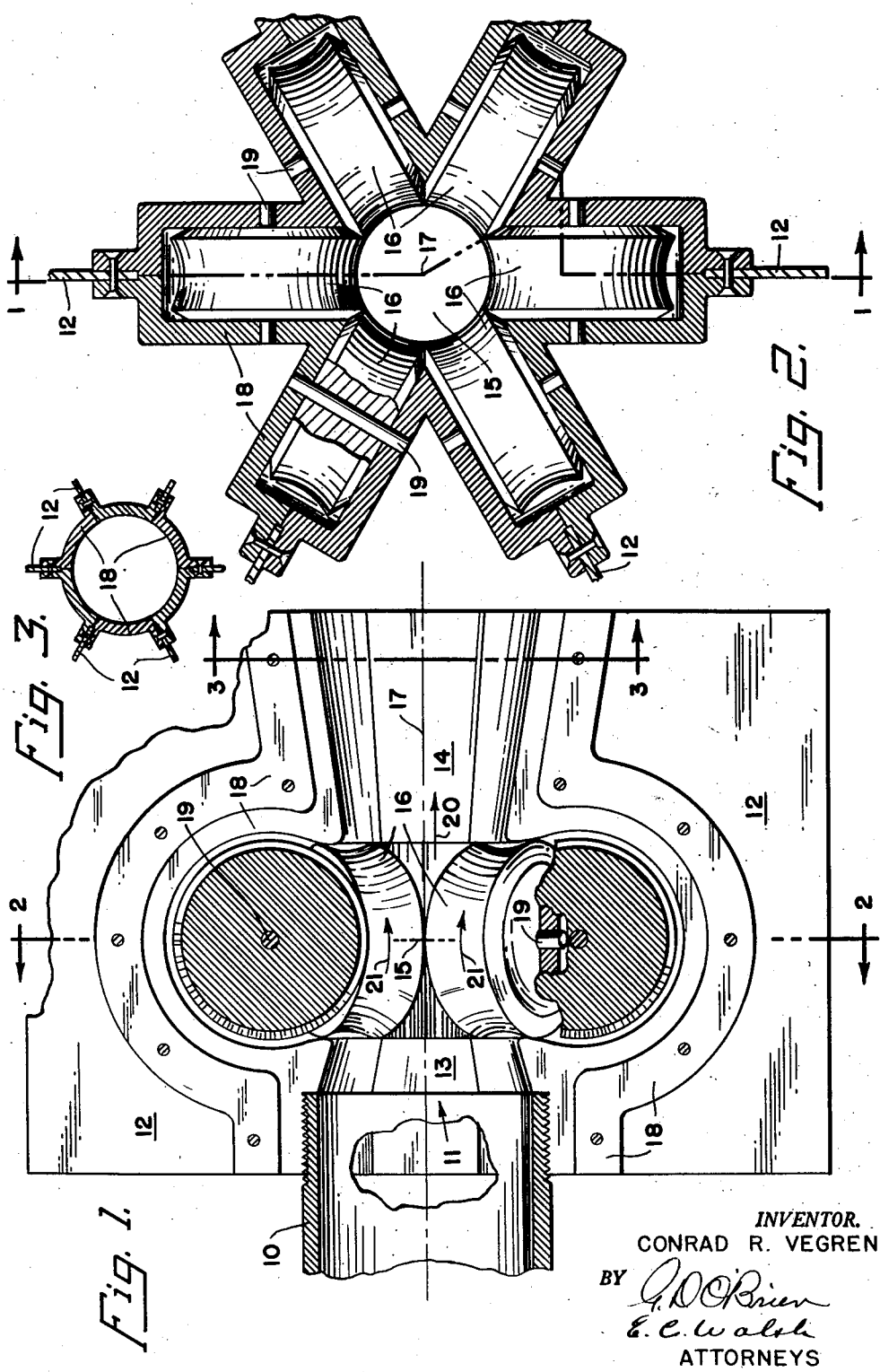

2,811,015
Patented Oct. 29, 1957

2,811,015
REACTION NOZZLE COMPRISING ROTATING THROAT SECTIONS

Conrad R. Vegren, Washington, D. C., assignor to the United States of America as represented by the Secretary of the Navy Application July 10, 1952, Serial No. 298,215
4 Claims. (Cl. 60—35.6)
(Granted under Title 35, U. S. Code (1952), sec. 266)

The invention described herein may be manufactured and used by or for the Government of the United States of America for governmental purposes without the payment of any royalties thereon or therefor.

This invention relates to rocket motors and more particularly to improvements in gas exhaust nozzles for same.

In the art of rocket motors, employing both liquid fuel and solid propellants, the throat or minimum aperture of the gas exhaust nozzle or nozzles controls the pressure and burning rate of the propellant which in turn determines the ballistic characteristics of the rocket. It is well known that the cross sectional area of the throat is highly critical and that small deviations from an optimum throat area may effect much larger aberrations in the ballistics of a rocket propelled by the motor. The high temperature and velocity of the products of combustion through the nozzle throat have an erosive effect on the latter, especially if the propellant burns for a considerable period of time, in which event the nozzle throat is often worn away sufficiently to effect the larger aberrations previously alluded to. It is apparent, therefore, that it is highly desirable to maintain the throat area as nearly constant as possible during the period of burning of the propellant.

One of the objects of this invention is to provide a rocket motor nozzle construction which will minimize deviation of nozzle throat area from an optimum due to the erosive effect of the rocket exhaust gas.

Another object of this invention is to provide a nozzle which will permit the use of longer burning propellants.

Another object is to minimize nozzle throat friction caused by the exhaust gas.

A further object is to provide exhaust gas operated gyroscopes for effecting improvement in the ballistics of a rocket.

Still further objects and many of the attendant advantages of this invention will be readily appreciated as the same becomes better understood by reference to the following detailed description when considered in connection with the accompanying drawings wherein:

Fig. 1 is a longitudinal section through a rocket nozzle, taken on line 1—1, Fig. 2, portions being broken away;

Fig. 2 is a transverse section of the rocket nozzle, taken on line 2—2, Fig. 1; and Fig. 3 is a reduced section, taken on line 3—3, Fig. 1.

Referring in detail to the drawing, the rocket comprises, in general, a tube 10 in which a propellant burns; an exhaust nozzle 11; and a plurality of fins 12.

Nozzle 11 is a conventional rocket venturi in that it is provided with rearwardly converging and diverging zones 13, 14, respectively, and an intermediate zone or throat 15 in the plane of minimum diameter on line 2—2. In the conventional rocket venturi, throat 15 is an integral transition wall between the converging and diverging zones and is immovable relative thereto.

In the present invention, throat 15 is formed by the peripheral surfaces of a plurality of rotatable roller-like members 16 which are angularly disposed about longitudinal axis 17 of the nozzle and mounted for rotation in a casing 18 by journal pins 19, which latter may be fixed to casing 18 with the members rotatable thereon, or fixed to the rollers and rotatably carried by the casing. As best shown in Fig. 2, these peripheral surfaces are concave in cross section and form a throat, circular in cross section, in the plane of line 2—2.

In the operation of the device, exhaust gas passing by the inner portions of members 16 in the direction of arrow 20 will rotate same in the direction of arrows 21. Such erosion of the concave surfaces which occurs will be distributed peripherally on the concave surfaces, and since the area of these surfaces is vastly greater than the area of the conventional integral throat previously referred to, the erosion will be considerably less than in the latter. It will also be apparent that longer burning propellants may be employed with this construction than with the conventional nozzle for comparable changes in throat area which thus permits increase in the range of the rocket.

The gyroscopic effect of the rollers also improves the ballistics of the rocket in that it minimizes axial rotation, yaw, drop off effect as in launching, and improves cross wind firing and stability. In respect to the previously stated applicability of the invention, the types of rocket motors in mind include JATO units, guided missiles, boosters and the like.

Obviously many modifications and variations of the present invention are possible in the light of the above teachings. It is therefore to be understood that within the scope of the appended claims the invention may be practiced otherwise than as specifically described.

I claim:

1. A rocket motor having an exhaust nozzle through which gas may issue in a rearward direction to effect thrust in a forward direction, comprising in combination; a plurality of circular members supported for rotation in angularly spaced substantially radial planes about the longitudinal axis of the nozzle, the axes of rotation of the members being disposed substantially in a plane perpendicular to said longitudinal axis, the construction and arrangement being such that a portion of the peripheral surface of each member forms a portion of a surrounding wall of the nozzle opening, the peripheral surface of each member being concave in cross section toward its axis of rotation.

2. Apparatus in accordance with claim 1 wherein the concave surface is circular with a radius of curvature equal to the radius of the opening formed by the members.

3. An exhaust nozzle for a rocket motor, comprising; substantially axially aligned converging and diverging zones and a throat zone disposed between said converging and diverging zones having a minimum cross sectional area in a plane perpendicular to the common axes of all of said zones, a plurality of circular members supported for rotation adjacent said throat zone and in angularly spaced radial planes about said axis, the axes of rotation of the members being disposed in said first named plane, each of said members being concave in cross section toward its axis of rotation, a portion of the peripheral surface of each member forming a portion of said throat in the first named plane, and portions at opposite sides of the portion aforesaid forming portions, respectively, of the converging and diverging zones, said members being adapted to rotate by exhaust gas passing through the nozzle.

4. Apparatus in accordance with claim 3 wherein adjacent side edges of adjacent members substantially meet at the cross section of minimum diameter of the throat.

References Cited in the file of this patent

UNITED STATES PATENTS

| 1,018,312 | Gherassimoff | Feb. 20, 1912 |
| 2,412,173 | Pope | Dec. 3, 1946 |
| 2,510,570 | Goddard | June 6, 1950 |

FOREIGN PATENTS

| 66,604 | Denmark | Mar. 30, 1948 |